(12) United States Patent
Qamar

(10) Patent No.: US 9,589,237 B1
(45) Date of Patent: Mar. 7, 2017

(54) SYSTEMS, METHODS AND COMPUTER PRODUCTS FOR RECOMMENDING MEDIA SUITABLE FOR A DESIGNATED ACTIVITY

(71) Applicant: SPOTIFY AB, Stockholm (SE)

(72) Inventor: Ahmad Qamar, New York, NY (US)

(73) Assignee: SPOTIFY AB, Stockholm (SE)

( * ) Notice: Subject to any disclaimer, the term of this patent is extended or adjusted under 35 U.S.C. 154(b) by 0 days.

(21) Appl. No.: 14/943,339

(22) Filed: Nov. 17, 2015

(51) Int. Cl.
  *G06F 15/18* (2006.01)
  *G06N 99/00* (2010.01)
  *G06Q 30/06* (2012.01)
  *G06F 17/30* (2006.01)

(52) U.S. Cl.
  CPC ..... *G06N 99/005* (2013.01); *G06F 17/30424* (2013.01); *G06Q 30/0631* (2013.01)

(58) Field of Classification Search
  None
  See application file for complete search history.

(56) References Cited

U.S. PATENT DOCUMENTS

| | | | |
|---|---|---|---|
| 7,260,568 B2 * | 8/2007 | Zhang | G06F 17/30663 707/711 |
| 7,668,825 B2 | 2/2010 | Vogel et al. | 707/6 |
| 7,765,166 B2 | 7/2010 | Beringer et al. | 705/319 |
| 7,860,862 B2 | 12/2010 | Slaney et al. | 707/736 |
| 8,189,963 B2 | 5/2012 | Li et al. | 382/305 |
| 8,549,017 B2 | 10/2013 | Saito et al. | 707/754 |
| 8,620,699 B2 | 12/2013 | Svendsen | 705/5 |
| 8,645,373 B2 | 2/2014 | Knight et al. | 707/733 |
| 8,669,457 B2 | 3/2014 | Ringewald et al. | 84/615 |
| 8,966,394 B2 | 2/2015 | Gates et al. | 715/733 |
| 9,122,747 B2 | 9/2015 | Inagaki | 707/736 |

(Continued)

OTHER PUBLICATIONS

Google, *Word2Vec*, https://code.google.com/p/word2vec (last visited Nov. 11, 2015).

(Continued)

*Primary Examiner* — Luis Sitiriche
(74) *Attorney, Agent, or Firm* — Fitzpatrick, Cella, Harper & Scinto

(57) ABSTRACT

Media content is recommended based on suitability for a designated activity. A vector engine is trained using a plurality of lists, each of the lists containing metadata associated with a plurality of media objects. The vector engine includes a neural network trained with corpus data including (i) the plurality of lists (ii) a plurality of titles, each one of the titles associated with one of the lists, and (iii) the metadata associated with the plurality of media objects. Training the vector engine involves initializing, using the vector engine, a plurality of feature vectors representing each of the lists, each of the media objects, and each of a plurality of words in the titles of the lists. The training then further involves nudging, using the vector engine, the feature vectors based on a plurality of co-occurrences of the lists, the media objects, the words in the titles of the lists, or a combination thereof. A feature vector corresponding to an activity is identified among the feature vectors. At least one of the media objects, (ii) at least one of lists or (iii) a combination thereof suitable for the activity is selected based on cosine similarities between the feature vector corresponding to the activity and others of the feature vectors.

30 Claims, 10 Drawing Sheets

(56) References Cited

U.S. PATENT DOCUMENTS

| | | | | |
|---|---|---|---|---|
| 9,158,754 | B2 | 10/2015 | Whitman et al. | 707/767 |
| 9,384,275 | B2 | 7/2016 | Stefik | 700/94 |
| 2006/0112098 | A1* | 5/2006 | Renshaw | G06F 17/30749 707/999.007 |
| 2007/0220552 | A1* | 9/2007 | Juster | H04N 21/4825 725/46 |
| 2010/0023506 | A1* | 1/2010 | Sahni | G06F 17/30876 707/E17.014 |
| 2010/0205222 | A1* | 8/2010 | Gajdos | G06F 17/30766 707/803 |
| 2011/0125763 | A1* | 5/2011 | Takanen | G06F 17/30979 707/749 |
| 2011/0191716 | A1* | 8/2011 | Sakamoto | G06F 17/30749 715/810 |
| 2011/0295843 | A1* | 12/2011 | Ingrassia, Jr. | G06F 17/30053 707/723 |
| 2013/0204885 | A1* | 8/2013 | Clinchant | G06K 9/4676 707/756 |
| 2013/0262469 | A1 | 10/2013 | Whitman | 707/741 |
| 2013/0262471 | A1 | 10/2013 | Whitman et al. | 707/742 |
| 2014/0074269 | A1* | 3/2014 | Weston | G06Q 30/0282 700/94 |
| 2014/0195544 | A1 | 7/2014 | Whitman | 707/744 |
| 2014/0279756 | A1 | 9/2014 | Whitman | 706/12 |
| 2014/0279817 | A1 | 9/2014 | Whitman et al. | 706/52 |
| 2014/0280181 | A1 | 9/2014 | Rodger et al. | 707/740 |

OTHER PUBLICATIONS

Le, et al., *Distributed Representations of Sentences and Documents*, Proceedings of the 31st International Conference of Machines Learning, Beijing, China, 2014. JMLR: W&CP vol. 32, (Jun. 21, 2014), http://cs.stanford.edu//~quocle/paragraph_vector.pdf.

Mikolov, et al., *Exploiting Similarities among Languages for Machine Translation*, CoRR, abs/1309, 4168, 2013b, (Sep. 17, 2013), https://arXiv:1309.4168v1.

Mikolov, et al., *Distributed Representations of Words and Phrases and their Compositionality*, (Oct. 16, 2013), http://papers.nips.cc/paper/5021-distributed-representations-of-words-and-phrases-and-their-compositionality.pdf.

Mikolov, et al., *Linguistic Regularities in Continuous Space Word Representations*, Proceedings of the 2013 Conference of the North American Chapter of the Association for Computational Linguistics: Human Language Technologies (NAACL-HLT-2013), (May 27, 2013), http://research.microsoft.com:pubs/189726/rvecs.pdf.

Mikolov, et al., *Efficient Estimation of Word Representations in Vector Space*, (Sep. 7, 2013), http:/arxiv.org/pdf/1301.3781.pdf.

Adomavicius, et al., "Toward the Next Generation of Recommender Systems: A Survey of the State-of-the-Art and Possible Extensions," IEEE, Transactions on Knowledge and Data Engineering, vol. 17, No. 6, pp. 734-749 (Jun. 2005).

Dato, "GraphLab Create™ API—Factorization Recommender," (https://dato.com/products/create/docs/generated/graphlab.recommender.factorization_recommender.FactorizationRecommender.html), (last visited Feb. 2, 2016).

Rendle, S., "Factorization Machines," Data Mining (ICDM), 2010 IEEE 10th International Conference on, pp. 995-1000 (Dec. 13, 2010), (http://www.csie.ntu.edu.tw/~b97053/paper/Rendle2010FM.pdf).

Scikit-Learn Developers, "Scikit Implementation" (http://scikit-learn.org/stable/modules/linear_model.html#logistic-regression), (last visited Feb. 2, 2016).

The Echo Nest™, "Acoustic Attributes Overview," (http://developer.echonest.com/acoustic-attributes.html), (last visited Feb. 2, 2016).

"Collaborative Filtering," Wikipedia, (https://en.wikipedia.org/wiki/Collaborative_filtering), (last visited Jul. 18, 2015).

Koren, Y. "Matrix Factorization Techniques for Recommender Systems," IEEE Computer Society, vol. 8 (Aug. 2009): pp. 42-49, (http://www2.research.att.com/~volinsky/papers/ieeecomputer.pdf), (last visited Aug. 11, 2016).

Johnson, Christopher C. "Logistic Matrix Factorization for Implicit Feedback Data." NIPS, (http://stanford.edu/~rezab/nips2014workshop/submits/logmat.pdf), (last visited Aug. 11, 2016).

* cited by examiner

```
>>> Activity_for_Title('All I Do is Win')
Workout     0.112
Wakeup      0.102
Party       0.083
Kids        0.071
Focus       0.069
Sleep       0.064
Relax       0.062
Walking     0.042
Driving     0.007
Discovery   0.005
```

FIG. 6

```
>>> Activity_for Tags('list:4Qej7iRH7a7oj3ddUnSWXt')
Tags Found: Run, Runners, Running, Tracks, Top, Great, Mix, Compilation
Workout     0.250
Walking     0.168
Driving     0.131
Relax       0.123
Focus       0.110
Kids        0.097
Party       0.078
Sleep       0.064
Wakeup      0.037
Discovery   0.029
```

FIG. 7

```
>>>Activity for List('5yzhuRH7a7oj3ddUnSWXt')
Focus      0.174
Relax      0.154
Morning    0.144
Sleep      0.134
Driving    0.121
Workout    0.092
Walking    0.076
Kids       0.071
Party      0.042
```

FIG. 8

```
Confidence: 0.3920
User: Johndoe
Time: Weekday 2PM - 6PM
```
| | |
|---|---|
| Workout | 41.09% |
| Focus | 39.55% |
| Relax | 7.55% |
| Sleep | 5.08% |
| Commute | 3.04% |
| Kids | 2.30% |
| Morning | 1.23% |
| Party | 0.16% |
| Walking | 0.00% |

FIG. 9

SYSTEMS, METHODS AND COMPUTER PRODUCTS FOR RECOMMENDING MEDIA SUITABLE FOR A DESIGNATED ACTIVITY

BACKGROUND

Field

This disclosure relates generally to media recommendation, and more particularly to systems, methods, and computer products for recommending media suitable for a designated activity.

Related Art

Media distribution (e.g. streaming) platforms have allowed consumers unprecedented access to large catalogs of music and videos. It is common for these platforms to include features that recommend media to a user, for example, by predicting a user's preferences based on a history of the user's interactions on the media distribution platform. Additionally, these platforms may include features that recommend media to a user for a particular type of activity, for example, media suitable for a certain style of dance, for a certain type of event, for a workout or a commute, or for relaxation.

Recommending media for a particular type of activity has generally required a high degree of human curation. Media distribution platforms typically employ editorial staff to manually create lists of media for various types of activities. These lists are then made accessible to users in the form of playlists, radio stations, video channels, or other media discovery features.

The foregoing approach suffers from shortcomings in scalability, accuracy, and efficiency. Human curation requires someone to listen to or view each media item and manually designate (i.e. tag) the media as suitable for a specific type of activity. For most media distribution platforms, with ever-expanding catalogs typically comprising millions of songs or videos, applying such methods at a scale that is comprehensive, consistent and adaptable to new types of activities is impractical. Human insights cannot be applied to media that has not yet been viewed, listened to or analyzed. Moreover, human curation is dependent on the accuracy of the editorial staff in tagging the media content and the results of the curation are not personalized to the tastes of individual users of the media distribution platforms. There has yet to be a technical solution for applying insights gleaned from human curation at scale to large catalogs of media content.

SUMMARY

The example embodiments described herein address the foregoing difficulties by providing a technical solution for recommending media suitable for a designated activity using data extracted from media object lists.

In one example embodiment, a vector engine is trained using a plurality of lists, each of the lists containing metadata associated with a plurality of media objects. The vector engine includes a neural network trained with corpus data including (i) the plurality of lists (ii) a plurality of titles, each one of the titles associated with one of the lists, and (iii) the metadata associated with the plurality of media objects contained in each list. Training the vector engine involves initializing, using the vector engine, a plurality of feature vectors representing each of the lists, each of the media objects, and each of a plurality of words in the titles of the lists. The training then further involves nudging, using the vector engine, the plurality of feature vectors based on a plurality of co-occurrences of the lists, the media objects, the words in the titles of the lists, or a combination thereof. Once trained, the vector engine can be used to select one or more of the lists, media objects, or a combination thereof based on cosine similarities between two or more of the feature vectors.

The neural network may be comprised of, for example, at least one of a Continuous Bag-of-Words (CBOW) model, a skip-gram model, a hierarchical soft-max model and a negative sampling model.

In an example aspect of the embodiment, a feature vector corresponding to an activity is identified among the plurality of feature vectors. At least one of the plurality of media objects, (ii) at least one of the plurality of lists or (iii) a combination thereof suitable for the activity is selected based on cosine similarities between the feature vector corresponding to the activity and others of the feature vectors.

In another example aspect, the vector engine is further trained with one or more pre-trained word vectors. In this example, training the vector engine further includes nudging, using the vector engine, the plurality of feature vectors and the pre-trained word vectors based on a plurality of co-occurrences of (i) the plurality of lists, (ii) the plurality of media objects, (iii) the plurality of words in the titles of the plurality of lists, (iv) the one or more pre-trained word vectors, or (v) a combination thereof.

In yet another example aspect, the vector engine is further trained with text corpus data that includes a plurality of documents each containing a plurality of words. In this example, training the vector engine further includes initializing, using the vector engine, feature vectors for each of the plurality of words contained in the plurality of documents, and nudging, using the vector engine, the plurality of feature vectors based on a plurality of co-occurrences of (i) the plurality of lists, (ii) the plurality of media objects, (iii) the plurality of words in the titles of the plurality of lists, (iv) the plurality of words contained in the plurality of documents, or (v) a combination thereof.

In still another example aspect, the corpus data further includes tags for the plurality of lists, each tag associating a word or phrase to one of the plurality of lists. In this example, training the vector engine further includes initializing, using the vector engine, feature vectors for each of a plurality of words in the tags of the plurality of lists, and nudging, using the vector engine, the plurality of feature vectors based on a plurality of co-occurrences of (i) the plurality of lists, (ii) the plurality of media objects, (iii) the plurality of words in the titles of the plurality of lists, (iv) the plurality of words in the tags of the plurality of lists, or (v) a combination thereof.

In another example, the vector engine is further trained with interaction data that includes a plurality of interaction histories, each metadata being associated with a plurality of media objects. In this example, training the vector engine further includes initializing, using the vector engine, feature vectors for each of the plurality of interaction histories, and nudging, using the vector engine, the plurality of feature vectors based on a plurality of co-occurrences of (i) the plurality of lists, (ii) the plurality of media objects contained in the plurality of lists, (iii) the plurality of words in the titles of the plurality of lists, (iv) the plurality of media objects contained in the plurality of interaction histories, or (v) a combination thereof.

In other example embodiments, data collected from a client device is used to detect that a user is engaging in an activity. A feature vector corresponding to the activity is identified among the plurality of feature vectors; and either (i) at least one of the plurality of media objects, (ii) at least one of the plurality of lists or (iii) a combination thereof suitable for the activity is selected based on cosine similarities between the feature vector corresponding to the activity and others of the plurality of feature vectors.

The data collected from the client device may include, for example, at least one of location data, calendar data, physical activity data, biometric data, accelerometer data, gyroscope data, user settings, third party application data, and client device type.

In other examples, a determination can be made as to whether a user is engaging in a designated activity based on cosine similarities between a feature vector corresponding to the activity and others of the plurality of feature vectors.

This brief summary has been provided so that the nature of this disclosure may be understood quickly. A more complete understanding can be obtained by reference to the following detailed description and to the attached drawings.

BRIEF DESCRIPTION OF THE DRAWINGS

The features and advantages of the example embodiments of the invention presented herein will become more apparent from the detailed description set forth below when taken in conjunction with the following drawings.

FIG. 6 is a view of example results for detecting an activity based on the title of a media object list according to an example embodiment.

FIG. 7 is a view of example results for detecting an activity based on tags according to an example embodiment.

FIG. 8 is a view of example results for detecting an activity based on a media object list according to an example embodiment.

FIG. 9 is a view of example results for detecting an activity based on an interaction history according to an example embodiment.

DETAILED DESCRIPTION

The example embodiments described herein provide systems, methods and computer products for recommending media suitable for a designated activity. This description is not intended to limit the application to the example embodiments presented herein. In fact, after reading the following description, it will be apparent to one skilled in the relevant art(s) how to implement the following example embodiments in alternative embodiments (e.g., in domains outside of media recommendation).

Figure 1:
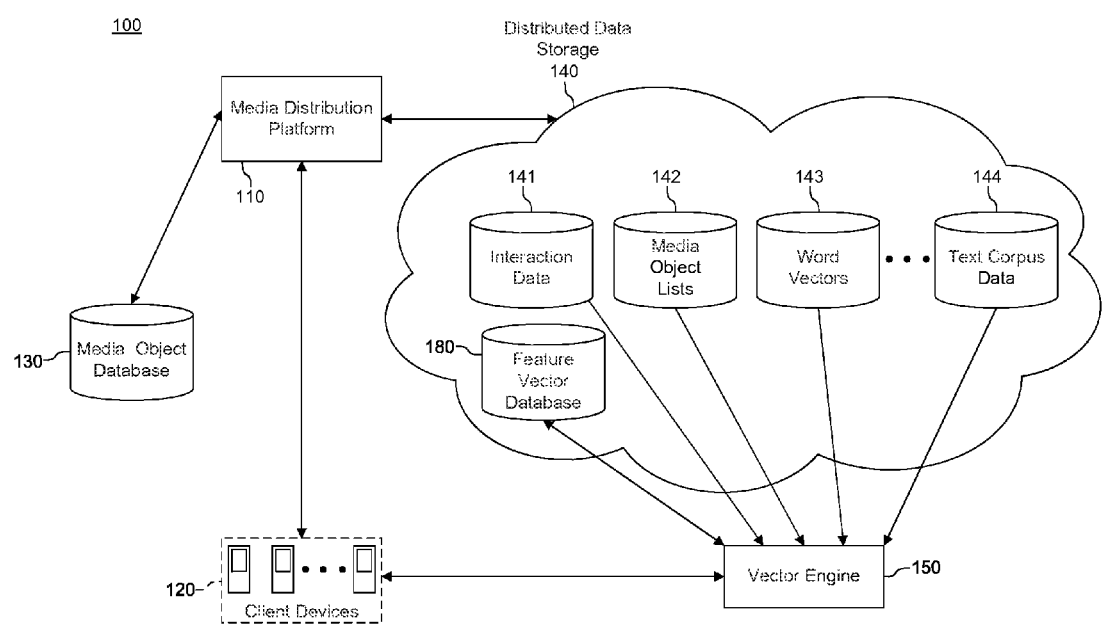
FIG. 1 is an architectural overview of a system for recommending media suitable for a designated activity according to an example embodiment.

FIG. 1 is an architectural overview of a system 100 for recommending media for a designated activity according to an example embodiment.

Media distribution platform 110 is a platform for distributing digital media content to end-users on client devices 120 each client device communicatively coupled to media distribution platform 110. Media distribution platform 110 may deliver a variety of media objects, including, but not limited to songs, audiobooks, podcasts, videos, movies and TV shows. Media objects are stored in the form of media files in media object database 130 communicatively coupled to media distribution platform 110. Media distribution platform 110 may distribute media to client devices 120 as downloadable objects (i.e. media files), live streaming objects (e.g. radio stations or video channels), on-demand streaming media, and so forth. Media distribution platform 110 may also deliver media-related applications and services to client devices 120. Media distribution platform 110 is able to store and retrieve data from distributed data storage 140.

Client devices 120 are computer hardware and/or software that allow an end-user to access and interact with the media content and services made available by media distribution platform 110. Client devices 120 access the media stored in the media object database 130 and the data of distributed data storage 140 through the media distribution platform 110. The client devices 120 are discussed in more detail with respect to FIG. 10.

Media object database 130 stores a catalog of media in the form of media files, as well as metadata associated with the media, such as song or video titles, artist names, song or video durations, and associated album titles.

Distributed data storage 140 stores data used by and collected from media distribution platform 110. Distributed data storage 140 may be a distributed file system such as, for example, any known or future known distributed file system and associated software framework such as an Apache Hadoop Distributed File System (HDFS) (i.e. "Hadoop Cluster") and the Apache MapReduce framework. Data from distributed data storage 140 may be queried or processed using a cluster-computing framework such as Apache Spark. Examples of data stored in distributed data storage 140 include, but are not limited to, interaction data 141, media object lists 142, word vectors 143, text corpus data 144 and feature vectors 180.

Interaction data 141 includes data collected from interactions performed by end-users on music distribution platform 110 (e.g. songs or videos played, playlists created, applications executed, etc.). These interactions can be performed, for example, using one of client devices 120 and may be collected into interaction histories (e.g. media sessions, or viewing and listening histories). Interaction histories are data structures that contain metadata corresponding to media objects from media object database 130 that an individual user has interacted with over a time period. This metadata can include, for example, media object identifiers for each of the media objects. Media object identifiers can be alphanumeric characters or other representations that, when processed, link metadata to an associated media object. Interaction histories can be used to provide personalized media recommendations to end-users, for example, by maintaining a taste profile for each end-user based on analysis of the interaction histories.

Media object lists 142 are data structures that contain metadata associated with a finite set of media objects (e.g. a music or video playlist, a saved favorites list or a media queue). The media object lists 142 can be user-generated at individual ones of client devices 120 (as described in more detail with respect to FIG. 2 below), automatically generated, or curated by an editorial staff.

Word vectors 143 include numerical vector representations of words and phrases (i.e. word embeddings). They represent words in an n-dimensional space, each dimension quantifying a latent feature of the words based on co-occurrences of the words in a text corpus, such as a collection of documents, articles, or books. Word vectors 143 can be created and processed by neural networks to group similar words based on context and to perform mathematical calculations on words. In the example embodiments described herein, word vectors 143 can include pre-trained word or phrase vectors, for example those made publicly available as part of the Google Word2Vec toolset (https://code.google.com/p/word2vec/).

Text corpus data 144 includes training text data that can be inputted into a neural network or vector encoding toolset (e.g. Word2Vec) to generate word vectors. Text corpus data may include any type of document or paragraph containing words in a useful context. For example, the text corpus data may include books, encyclopedia entries or news articles. In other examples, the text corpus data may include text from media-related editorial content such as music or film related reviews, news articles, or social media commentary. This media-related editorial content can, for example, be periodically scraped from the web.

Vector engine 150 includes a trainable neural network that generates feature vectors for various objects and performs mathematical computations on the generated feature vectors. The neural network, for example, implements known or future known algorithms or toolsets such as the Google Word2vec toolset and modifications thereof. As described more fully below with respect to FIG. 3, in addition to using word vectors 143 and text corpus data 144, vector engine 150 can be trained using interaction data 141 and media object lists 142. Vector engine 150 can initialize latent feature vectors for words, individual media object lists, individual media objects, and individual interaction histories. Mathematical computations, such as computational nudging, can be performed on the feature vectors based on co-occurrences of media objects in the media object lists, co-occurrences of media objects or media object lists in interaction histories, or co-occurrences of words in the titles of the media object lists or in the metadata associated with the media objects. Once trained, vector engine 150 is able to recommend media to a user by performing additional computations on the various feature vectors, for example, by calculating cosine similarities between the feature vectors.

Feature vector database 180 stores feature vectors generated by vector engine 150. The feature vectors can be periodically updated through computations performed by vector engine 150 based on new contexts (i.e. new co-occurrences of objects corresponding to the feature vectors). The stored feature vectors may also be accessed and used by other applications external to vector engine 150.

Figure 2:
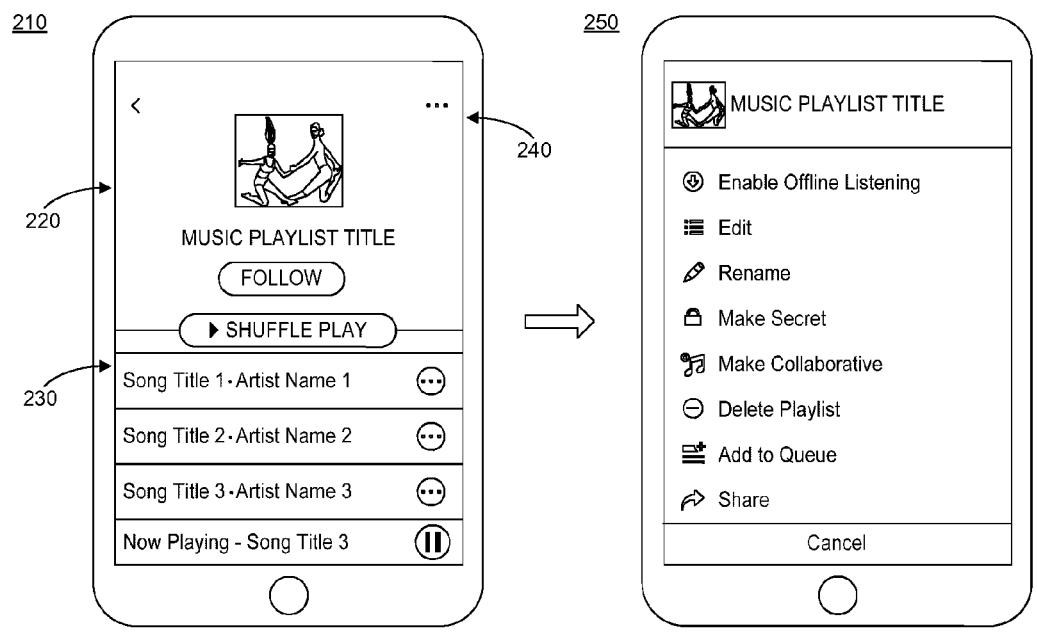
FIG. 2 depicts a user interface presenting a view for explaining media object lists according to an example embodiment.

FIG. 2 depicts a user interface that presents a view for explaining media object lists according to an example embodiment. FIG. 2 particularly shows two screens, playlist view screen 210 and playlist edit screen 250, in an example media streaming application running on a client device 120. In this example, the media streaming application is a music streaming application and playlist view screen 210 shows a screen for viewing a music playlist. A music playlist is one example of media object lists 142 as would be presented through a user interface. The music playlist has a title 220 ("Dance Workout") and lists metadata corresponding to a finite set of media objects stored in media object database 130. In this example, the set of media objects are songs and the songs are listed by their corresponding song titles. Additional metadata associated with the songs are also displayed for each song, including an artist name and an album title. The playlist view screen 210 provides means by which to select a media object (i.e. song). In one exemplary embodiment, a media object from media object database 130 can be retrieved for playback by, for example, selecting a song title from the music playlist. Button 240 on playlist view screen 210 causes the music streaming application to display playlist edit screen 250, where several functions are presented allowing for editing of the music playlist. In this example, the music playlist can be enabled for offline listening, the contents in the music playlist may be edited (e.g. songs added or removed), the title of the music playlist can be renamed, and so forth. The example music streaming application allows for new music playlists to be user-generated and edited on client device 120. Alternatively, music playlists can be automatically generated, for example, by a software application, or can be curated by an editorial staff.

Figure 3:
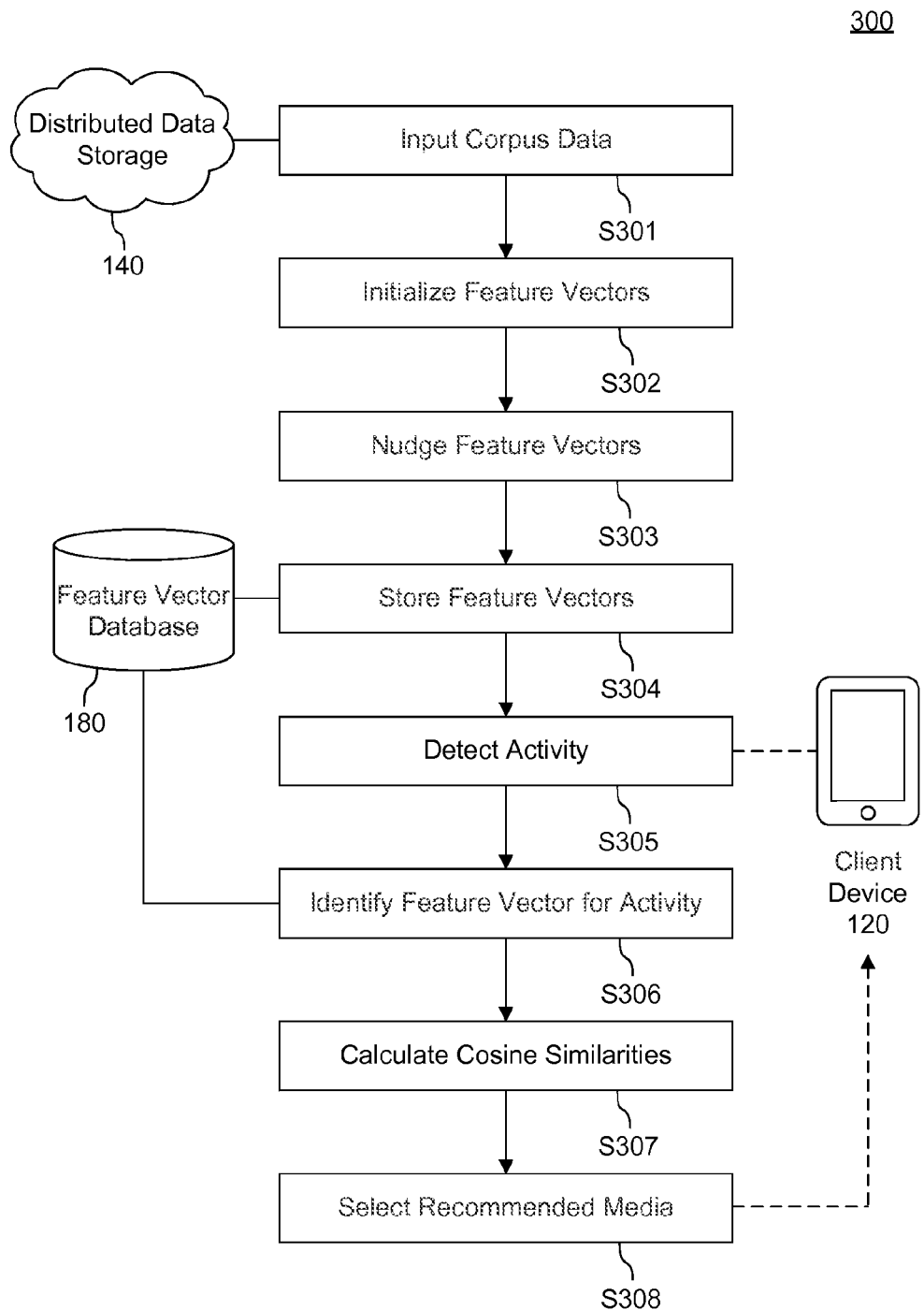
FIG. 3 is a flow diagram for explaining a process for recommending media suitable for a designated activity according to an example embodiment.

FIG. 3 is a flow diagram for explaining a process for recommending media objects suitable for a designated activity by using data extracted from media object lists. The process can be performed, for example, by the system of FIG. 1.

Briefly, in FIG. 3, corpus data from distributed data storage 140 is input into vector engine 150. Vector engine 150 initializes feature vectors, each feature vector representing an object from the corpus data. The vector engine 150 nudges the feature vectors based on co-occurrences of the objects in the corpus data and then stores the feature vectors in feature vector database 180. Client device 120 then detects that a user is engaging in a designated activity and vector engine 150 identifies a feature vector among the feature vectors stored in feature vector database 180 associated with the activity. Vector engine 150 then calculates cosine similarities between the feature vector associated with the activity and other feature vectors stored in feature vector database 180. The calculated cosine similarities define similarities and differences between the objects and can then be used by the vector engine 150 to select a media object or a media object list and/or recommend a media object or media object list to a user.

In more detail, in step S301, corpus data is inputted into vector engine 150 in order to train vector engine 150 on the contexts that relate or differentiate various objects. The corpus data may be collected, for example, from distributed data storage 140 and may include media object lists 142, each media object list containing metadata associated with a plurality of media objects stored in media object database 130, and each media object list having a title. The media object lists may each also include or be linked to one or more tags, each tag associating a word or phrase to the respective media object list. The corpus data may also include word vectors 143 and text corpus data 144, as well as interaction data 141, including a plurality of interaction histories, each interaction history containing metadata associated with a plurality of media objects in media object database 130. The corpus data provides data on various co-occurrences of objects, for example, two media objects contained in the same media object list, a common word appearing in the titles of two different media object lists, two media objects found in the same interaction history, a word found in a title of a media object list and also appearing in a document of the text corpus data, and so forth.

In step S302, vector engine 150 includes a neural network or vector encoding toolset that initializes feature vectors for various objects in the corpus data. For example, feature vectors may be initialized for each media object list, each word in the titles of the media object lists, each word contained in the text corpus data, each tag of the plurality of media object lists, each interaction history, each media object, and so forth. The initialized feature vectors are numerical vector representations of each object, each feature vector comprising n-dimensions each quantifying a latent feature of the objects. In examples described herein, each feature vector is comprised of 40 dimensions, but feature vectors of any number of dimensions may be initialized. Generally speaking, a greater number of dimensions allows for increased specificity in defining the similarities and differences between objects, but demands increased computational resources when initializing or performing computations on the feature vectors.

In step S303, vector engine 150 nudges the feature vectors based on co-occurrences of the respective objects within the corpus data. Nudging of the feature vectors involves modifying the numerical values of the feature vectors using one or a combination of known computational algorithms including, but not limited to, gradient descent, stochastic gradient decent, Continuous Bag-of Words (CBOW), skip-gram, hierarchical soft-max or negative sampling.

In step S304, the features vectors are stored by vector engine 150 in feature vector database 180. The stored feature vectors may be routinely updated by performing additional computations on the feature vectors based on newly inputted or updated corpus data or newly identified co-occurrences between objects in the corpus data. The stored feature vectors are accessible to vector engine 150 for further computations as well as to applications and devices external to vector engine 150 such as additional applications connected to media distribution platform 110.

In step S305, an activity is detected. The activity can be detected by vector engine 150 or by client device 120, for example, based on data collected from client device 120. The data collected from client device 120 can include, but is not limited to, location data, calendar data, physical activity data, biometric data, accelerometer data, gyroscope data, user settings, third party application data and client device type. This data can be collected by sensors on the client device 120 including, but not limited to, a GPS sensor, activity tracking sensor, biometric sensor, accelerometer or gyroscope. The data can also be collected from applications running on client device 120 such as a media streaming application, third party applications or an operating system.

In step S306, vector engine 150 identifies, among the feature vectors stored in feature vector database 180, a feature vector corresponding to the detected activity. This can be, for example, a feature vector for a word associated with the activity (e.g. feature vectors for the words "run", "running", or "exercise" when a workout activity is detected). It can also be a feature vector for any other object with a known association to the detected activity (e.g. a feature vector for a media object identifier contained in a "workout" media object list). It can also be a feature vector representation of the activity itself generated by vector engine 150 (e.g. a "workout" feature vector).

In step S307, vector engine 150 calculates the cosine similarities between the feature vector identified in step S306 and other feature vectors stored in feature vector database 180 (i.e. the distance between the two vectors in the vector space).

In step S308, vector engine 150 sorts the computed cosine similarities to identifying various objects from the corpus data that are closest in the vector space to the activity detected in step S305 and selects one or more of the objects to be recommended to an end-user, for example, through a media streaming application running on client device 120. For example, a detection of a workout activity in step S305 would result in the selection in step S308 of one or more media objects, media object lists, or a combination thereof suitable for a workout.

Figure 4:
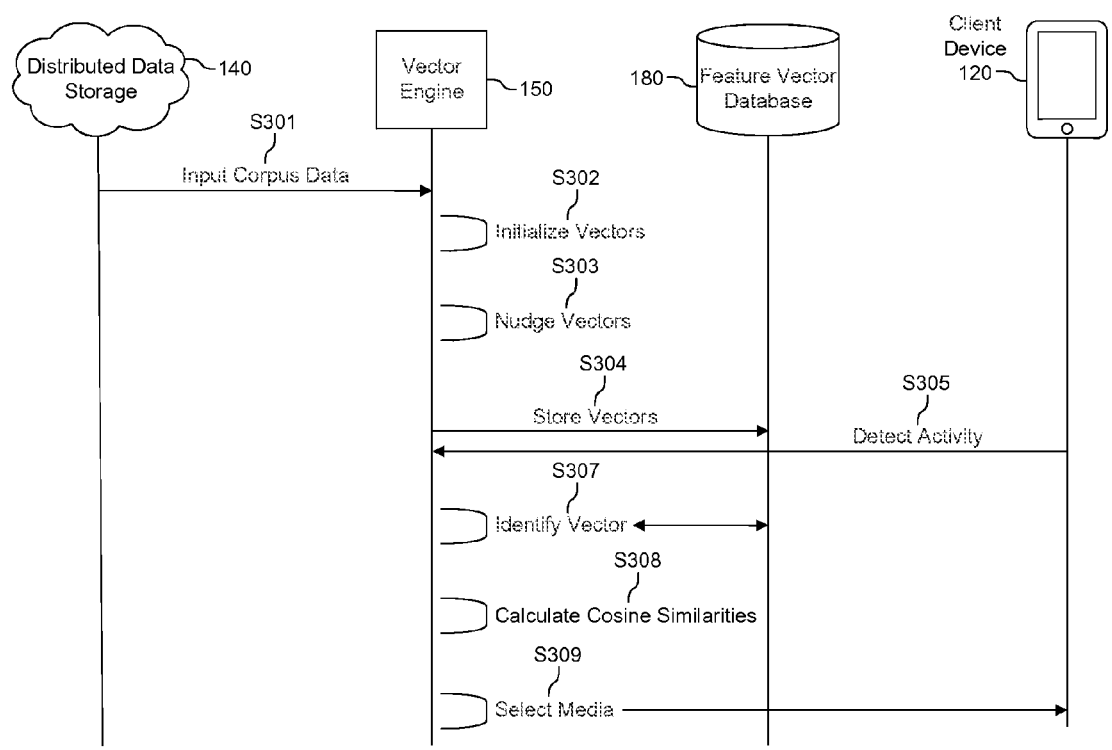
FIG. 4 is an additional view for explaining the process of FIG. 3.

FIG. 4 is an additional view for explaining the process of FIG. 3 and the manner in which data flows between distributed data storage 140, vector engine 150, feature vector database 180 and client device 120.

In step S301, corpus data from distributed data storage 140 is input into vector engine 150. Steps S302 and S303 are then performed by vector engine 150 using the inputted corpus data. In step S304, vectors generated by vector engine 150 are stored in feature vector database 180. In step S305, data from client device 120 is used to detect an activity and the detected activity is indicated to vector engine 150. Steps S307, S308 and S309 are then performed by vector engine 150 and the resulting media objects or media object playlists are sent by vector engine 150 to client device 120 to be presented to an end-user in the form of, for example, a playlist, radio station, video channel or other media discovery feature.

Figure 5:
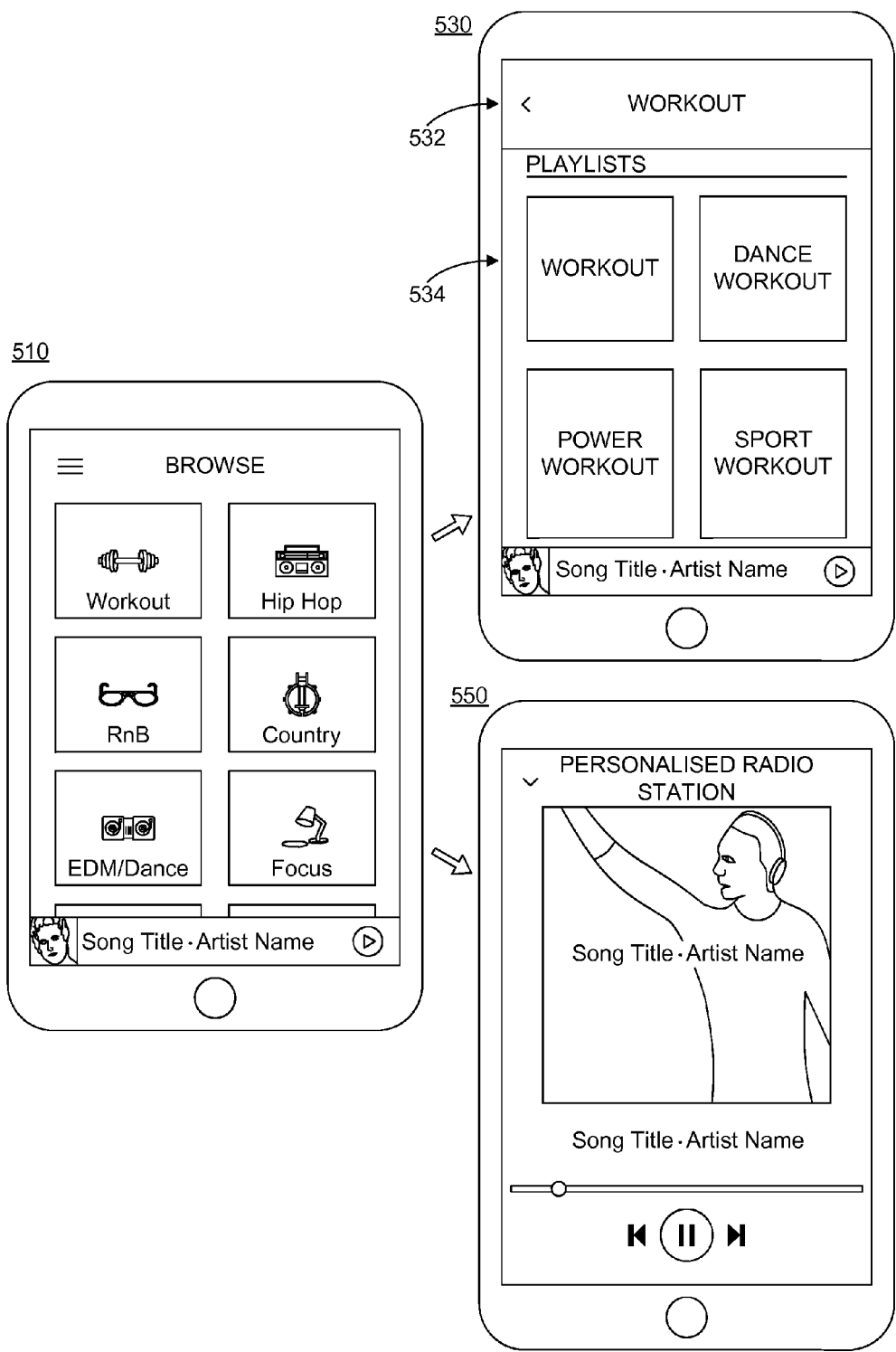
FIG. 5 is a view of a user interface for selecting a designated activity according to an example embodiment.

FIG. 5 is a view of a user interface for selecting a designated activity according to an example embodiment.

In the example of FIG. 5, rather than detecting an activity using sensor or application data from client device 120 as described in step S305 of FIGS. 3 and 4, a media streaming application running on client device 120 allows an end-user to manually input an activity. This is shown in example screen 510, which depicts a user interface for browsing through various activities and selecting a designated activity. The processes of FIGS. 3 and 4 are then performed in order to select media objects or media object playlists suitable for the selected activity. The selected media objects or media object playlists can be presented on client device 120 through features in the media streaming application, for example, features shown in playlist recommendation screen 530 and radio station screen 550. Playlist recommendation screen 530 depicts an example feature in which several playlists 534 suitable for a designated activity 532 (e.g. workout) are presented. Radio station screen 550 depicts an example radio station feature in which songs suitable for a designated activity (e.g. workout) are presented sequentially. Radio station screen 530 depicts the radio station feature as having user interface elements that allow for pausing, skipping or restarting a song. It should be understood that the results of the methods, systems and programs described herein can be presented in numerous formats using various types of applications running on many different types of client devices 120.

In other examples provided herein, vector engine 150 can be used to determine what activity a user is likely engaging in. This can be done, for example, by comparing cosine similarities between feature vectors corresponding to media that the user has interacted with (e.g. media objects identified in interaction histories) and feature vectors corresponding to various activities that the user might be engaged in.

FIG. 6 is a view of example results for detecting an activity based on the title of a media object list according to an example embodiment.

In the example of FIG. 6, feature vectors corresponding to various activities (e.g. workout, wakeup, party, and so forth) are compared to feature vectors for words appearing in the title of a media object list (e.g. a playlist titled "All I Do Is Win"). FIG. 6 depicts an ordered listing of the feature vectors based on cosine similarities. According to the results shown in FIG. 6, the title of the media object list suggests the activity "workout".

FIG. 7 is a view of example results for detecting an activity based on tags according to an example embodiment.

In the example of FIG. 7, feature vectors corresponding to various activities are compared to feature vectors for words appearing in the tags of a media object list. FIG. 7 depicts an ordered listing of the feature vectors based on cosine similarities. According to the results shown in FIG. 7, the tags of the media object list once again suggest the activity "workout".

FIG. 8 is a view of example results for detecting an activity based on a media object list according to an example embodiment.

In the example of FIG. 8, feature vectors corresponding to various activities are compared to a feature vector for a media object list. FIG. 8 depicts an ordered listing of the feature vectors based on cosine similarities. According to the results shown in FIG. 8, the media object list is most likely associated with the activity "focus".

FIG. 9 is a view of example results for detecting an activity based on an interaction history according to an example embodiment.

In the example of FIG. 9, feature vectors corresponding to various activities are compared to feature vectors for media objects contained in an interaction history for a user. FIG. 9 depicts an ordered listing of the activities based on probabilities computed from cosine similarities. According to the results shown in FIG. 9, it is predicted with 0.3920 confidence that, based on interaction data collected for a user on weekdays between 2 pm and 6 pm, there was a 41.09% probability that the user was engaged in a "workout" activity during that time period.

The various methods of detecting activities shown in the examples of FIGS. 6 through 9 can also be combined, since the example embodiments described herein incorporate feature vectors of all four types including words, media objects, media object playlists and interaction histories.

Figure 10:
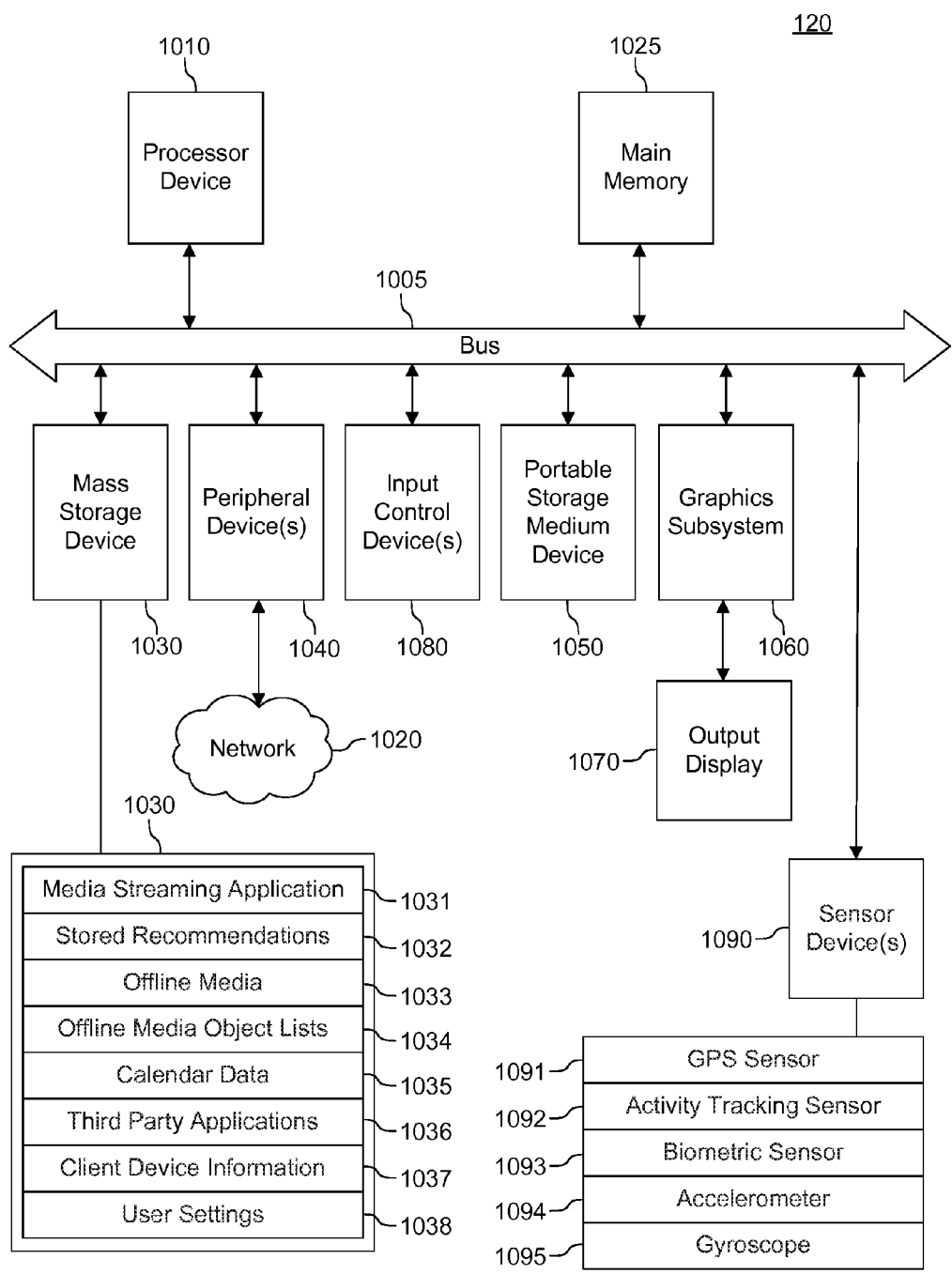
FIG. 10 is a block diagram of a client device according to an example embodiment.

FIG. 10 is a block diagram showing an example of one of the client devices 120 (e.g., 120, FIG. 1), in accordance with some of the example embodiments described herein.

The client device 120 may include without limitation a processor device 1010, a main memory 1025, and an interconnect bus 1005. The processor device 1010 may include without limitation a single microprocessor, or may include a plurality of microprocessors for configuring the client device 120 as a multi-processor system. The main memory 1025 stores, among other things, instructions and/or data for execution by the processor device 1010. The main memory 1025 may include banks of dynamic random access memory (DRAM), as well as cache memory.

The client device 120 may further include a mass storage device 1030, peripheral device(s) 1040, portable non-transitory storage medium device(s) 1050, input control device(s) 1080, a graphics subsystem 1060, an output display interface 1070, and/or sensor device(s) 1090. For explanatory purposes, all components in the client device 120 are shown in FIG. 10 as being coupled via the bus 1005. However, the client device 120 is not so limited. Elements of the client device 120 may be coupled via one or more data transport means. For example, the processor device 1010 and/or the main memory 1025 may be coupled via a local microprocessor bus. The mass storage device 1030, peripheral device(s) 1040, portable storage medium device(s) 1050, graphics subsystem 1060, and/or sensor device(s) 1090 may be coupled via one or more input/output (I/O) buses. The mass storage device 1030 may be a nonvolatile storage device for storing data and/or instructions for use by the processor device 1010. The mass storage device 1030 may be implemented, for example, with a magnetic disk drive or an optical disk drive. In a software embodiment, the mass storage device 1030 is configured for loading contents of the mass storage device 1030 into the main memory 1025.

Mass storage device 1030 additionally stores media streaming application 1031, stored recommendations 1032, offline media 1033, offline media object lists 1034, calendar data 1035, third party applications 1036, client device information 1037, and user settings 1038. Music streaming application 1031 is a software application that enables client device 120 to access and interact with the music content and services made available by music distribution platform 110. Stored recommendations 1032 include recommendations stored for a specific user on the client device, such as recommendations provided by vector engine 150. Offline media 1033 includes media objects downloaded to client device 120 for offline accessibility, for example, song or video files that have been selected based on the stored recommendations 1032. Offline media object lists 1034 include media object lists generated on and/or saved to the client device 120. Alternatively, media object lists generated on the client device 120 may be stored on the server side. Calendar data 1035 may include data generated by a calendar application such as events, appointments or reminders. Third party applications 1036 may include any applications external to the media streaming application such as social network applications, exercise applications, health monitoring applications, and data generated therein. Client device information 1037 may include for example client device type (e.g. whether client device 120 is a mobile device or a desktop computer) or client device settings (e.g. whether Wi-Fi is enabled). User settings 1038 may include user selected settings such as whether the client device 120 is in silent mode or whether certain notifications have been enabled or disabled.

The portable storage medium device 1050 operates in conjunction with a nonvolatile portable storage medium, such as, for example, a compact disc read only memory (CD-ROM), to input and output data and code to and from the client device 120. In some embodiments, the software for storing information may be stored on a portable storage medium, and may be inputted into the client device 120 via the portable storage medium device 1050. The peripheral device(s) 1040 may include any type of computer support device, such as, for example, an input/output (I/O) interface configured to add additional functionality to the client device 120. For example, the peripheral device(s) 1040 may include a network interface card for interfacing the client device 120 with a network 1020.

The input control device(s) 1080 provide a portion of the user interface for a user of the client device 120. The input control device(s) 1080 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the client device 120 may include the graphics subsystem 1060 and the output display 1070. The output display 1070 may include a display such as a CSTN (Color Super Twisted Nematic), TFT (Thin Film Transistor), TFD (Thin Film Diode), OLED (Organic Light-Emitting Diode), AMOLED display (Activematrix organic light-emitting diode), and/or liquid crystal display (LCD)-type displays. The displays can also be touchscreen displays, such as capacitive and resistive-type touchscreen displays.

The graphics subsystem 1060 receives textual and graphical information, and processes the information for output to the output display 1070.

Input control devices 1080 can control the operation and various functions of client device 120.

Input control devices 1080 can include any components, circuitry, or logic operative to drive the functionality of client device 120. For example, input control device(s) 1080 can include one or more processors acting under the control of an application.

Sensor device(s) 1090 may include, for example, a GPS sensor 1091, activity tracking sensor 1092, biometric sensor 1093, accelerometer 1094 or gyroscope 1095. The GPS sensor 1091 can provide useful location data for detecting an activity such as whether the client device 120 is currently located at an office or a gym. The activity tracking sensor 1092 can provide data such as a number of steps taken by a user or a number of calories burned. The biometric sensor 1093 can provide biometric data that may suggest an activity such as heart rate data. The accelerometer 1094 and gyroscope 1095 can provide data on physical actions such as exercise or movement such as an acceleration indicating that the client device 120 is in a vehicle, such as a car during a commute.

Figure 11:
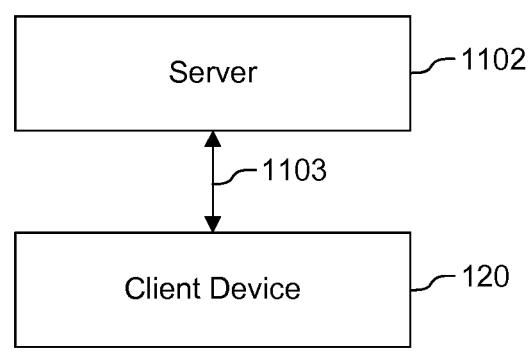
FIG. 11 is a block diagram of an example client-server data system according to an example embodiment.

FIG. 11 is a block diagram of an example client-server data system 1100 configured in accordance with the principles of the invention. Data system 1100 can include server 1102 and client device 120. In some embodiments, data system 1100 can include multiple servers 1102, multiple client devices 120, or both multiple servers 1102 and multiple client devices 120. For simplicity, only one server 1102 and one client device 102 are illustrated.

Server 1102 may include any suitable types of servers that can store and provide data to client device 102 (e.g., file server, database server, web server, distributed server, clustered servers, or a media server). Server 1102 can store data, and server 1102 can receive data download requests from client device 120.

In some embodiments, server 1102 can obtain and process data from one or more client devices 120.

Server 1102 can communicate with client device 102 over communications link 1103. Communications link 1103 can include any suitable wired or wireless communications link, or combinations thereof, by which data may be exchanged between server 1102 and client device 120. For example, communications link 1103 can include a satellite link, a fiber-optic link, a cable link, an Internet link, or any other suitable wired or wireless link. Communications link 1103 may enable data transmission using any suitable communications protocol supported by the medium of communications link 1103. Such communications protocols may include, for example, Wi-Fi (e.g., a 802.11 protocol), Ethernet, Bluetooth™, radio frequency systems (e.g., 900 MHz, 2.4 GHz, and 5.6 GHz communication systems), infrared, TCP/IP (e.g., and the protocols used in each of the TCP/IP layers), HTTP, BitTorrent, FTP, RTP, RTSP, SSH, any other communications protocol, or any combination thereof.

Client device 120 can include any electronic device capable of communicating and/or displaying or providing data to a user and may be operative to communicate with server 1102. For example, client device 120 can include a portable media player, a cellular telephone, pocket-sized personal computers, a desktop computer, a laptop computer, a tablet, and any other device capable of communicating via wires or wirelessly (with or without the aid of a wireless enabling accessory device).

Figure 12:
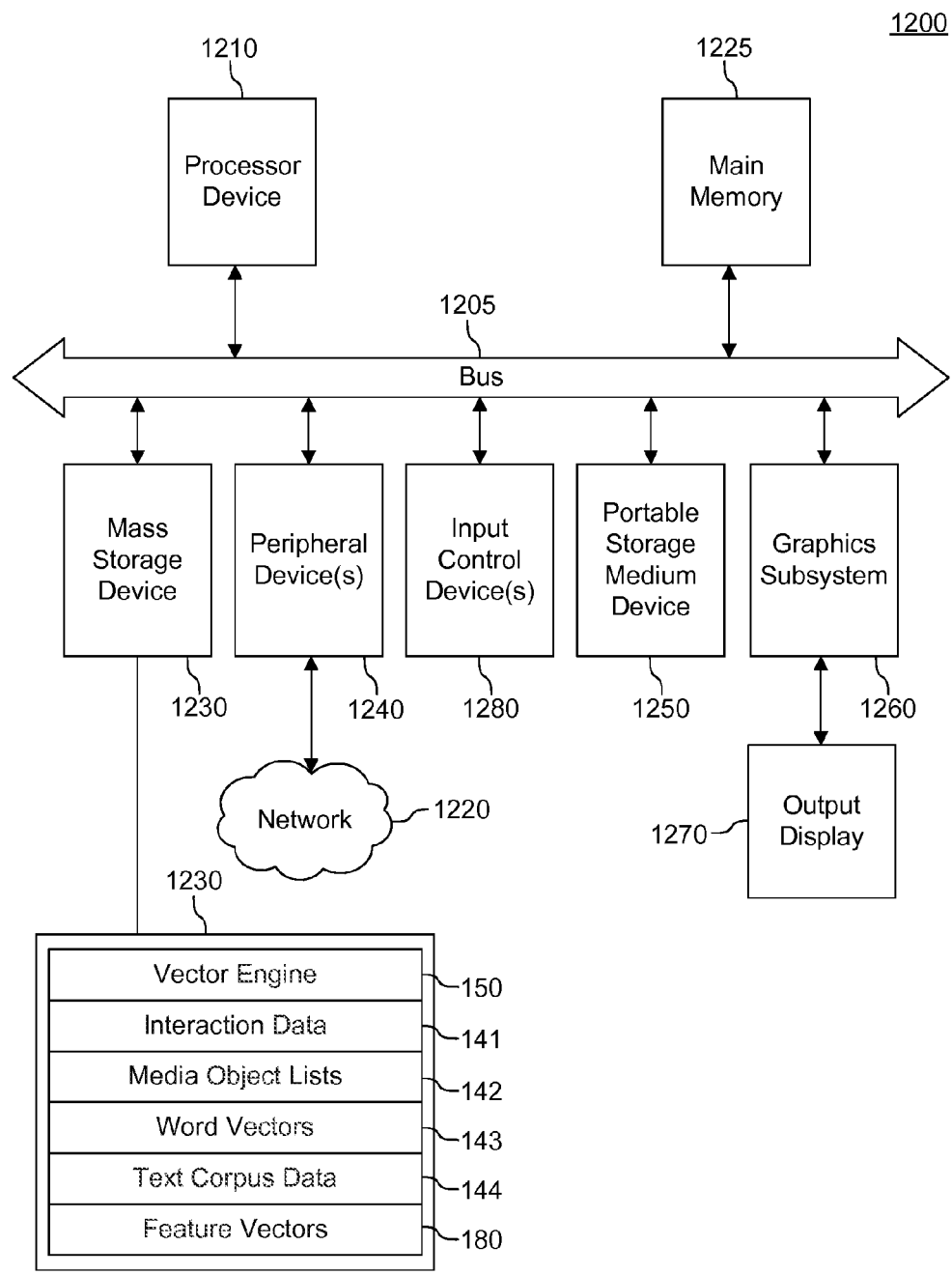
FIG. 12 is a block diagram of a special purpose server-side computer constructed to realize the server-side functionality of the example embodiments.

FIG. 12 is a block diagram of a special purpose server-side computer 1200 constructed to realize the server-side functionality of the example embodiments. Computer 1200 may include any of processor device 1210, main memory 1225, bus 1205, mass storage device 1230, peripheral devices 1240, input control devices 1280, portable storage medium device 1250, graphics subsystem 1260, and output display 1270, all of which can be configured in the manners described above with respect to the respective elements illustrated in FIG. 10.

The mass storage device 1220 of server-side computer 1200 stores vector engine 150. Additionally, mass storage device 1230 may optionally store interaction data 141, media object lists 142, word vectors 143, text corpus data 144 or feature vectors 180 extracted from distributed data storage 140.

Computer 1200 might be incorporated in a stand-alone apparatus or in a multi-component apparatus, such as for grid computing in a cluster of servers or a distributed file system.

Each component of the client device 120 and computer 1200 may represent a broad category of a computer component of a general and/or special purpose computer. Components of the client device 120 and computer 1200 are not limited to the specific implementations provided herein.

Software embodiments of the example embodiments presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine- or computer-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer-readable media further include software for performing example aspects of the invention, as described above.

Included in the programming and/or software of the general and/or special purpose computer or microprocessor are software modules for implementing the procedures described above.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIGS. 1-12 are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method of selecting media suitable for a predetermined activity, comprising the steps of:
    training a vector engine using a plurality of lists, each of the plurality of lists containing metadata associated with a plurality of media objects, the vector engine including a neural network trained with corpus data including (i) the plurality of lists (ii) a plurality of titles each one of the plurality of titles associated with one of the plurality of lists and (iii) the metadata associated with the plurality of media objects in each list, wherein training the vector engine includes:
    initializing, using the vector engine, a plurality of feature vectors representing each of the plurality of lists, each of the plurality of media objects, and each of a plurality of words in the titles of the plurality of lists, and
    nudging, using the vector engine, the plurality of feature vectors based on a plurality of co-occurrences of (i) the plurality of lists, (ii) the plurality of media objects, (iii) the plurality of words in the titles of the plurality of lists, or (iv) a combination thereof; and
    selecting either (i) at least one of the plurality of media objects, (ii) at least one of the plurality of lists, or (iii) a combination thereof based on cosine similarities between two or more of the plurality of feature vectors.

2. The method according to claim 1 wherein the neural network is comprised of at least one of a gradient descent model, a stochastic gradient descent model, a Continuous Bag-of-Words (CBOW) model, a skip-gram model, a hierarchical soft-max model and a negative sampling model.

3. The method according to claim 1 further comprising the steps of:
    identifying among the plurality of feature vectors a feature vector corresponding to an activity; and
    selecting either (i) at least one of the plurality of media objects, (ii) at least one of the plurality of lists or (iii) a combination thereof suitable for the activity based on cosine similarities between the feature vector corresponding to the activity and others of the feature vectors.

4. The method according to claim 1, wherein the vector engine is further trained with one or more pre-trained word vectors, wherein training the vector engine further includes:
    nudging, using the vector engine, the plurality of feature vectors and the pre-trained word vectors based on a plurality of co-occurrences of (i) the plurality of lists, (ii) the plurality of media objects, (iii) the plurality of words in the titles of the plurality of lists, (iv) the one or more pre-trained word vectors, or (v) a combination thereof.

5. The method according to claim 1, wherein the vector engine is further trained with text corpus data that includes a plurality of documents each containing a plurality of words, wherein training the vector engine further includes:
    initializing, using the vector engine, feature vectors for each of the plurality of words contained in the plurality of documents; and
    nudging, using the vector engine, the plurality of feature vectors based on a plurality of co-occurrences of (i) the plurality of lists, (ii) the plurality of media objects, (iii) the plurality of words in the titles of the plurality of lists, (iv) the plurality of words contained in the plurality of documents, or (v) a combination thereof.

6. The method according to claim 1, wherein the corpus data further includes tags for the plurality of lists each tag associating a word or phrase to one of the plurality of lists, wherein training the vector engine further includes:
    initializing, using the vector engine, feature vectors for each of a plurality of words in the tags of the plurality of lists; and
    nudging, using the vector engine, the plurality of feature vectors based on a plurality of co-occurrences of (i) the plurality of lists, (ii) the plurality of media objects, (iii)

the plurality of words in the titles of the plurality of lists, (iv) the plurality of words in the tags of the plurality of lists, or (v) a combination thereof.

7. The method according to claim 1, wherein the vector engine is further trained with interaction data that includes a plurality of interaction histories each containing metadata associated with a plurality of media objects, wherein training the vector engine further includes:
  initializing, using the vector engine, feature vectors for each of the plurality of interaction histories; and
  nudging, using the vector engine, the plurality of feature vectors based on a plurality of co-occurrences of (i) the plurality of lists, (ii) the plurality of media objects contained in the plurality of lists, (iii) the plurality of words in the titles of the plurality of lists, (iv) the plurality of media objects contained in the plurality of interaction histories, or (v) a combination thereof.

8. The method according to claim 1 further comprising the steps of:
  detecting that a user is engaging in an activity based on data collected from a client device;
  identifying among the plurality of feature vectors a feature vector corresponding to the activity; and
  selecting either (i) at least one of the plurality of media objects, (ii) at least one of the plurality of lists or (iii) a combination thereof suitable for the activity based on cosine similarities between the feature vector corresponding to the activity and others of the plurality of feature vectors.

9. The method according to claim 8 wherein the data collected from the client device includes at least one of location data, calendar data, physical activity data, biometric data, accelerometer data, gyroscope data, user settings, third party application data, and client device type.

10. The method according to claim 1 further comprising the step of:
  detecting that a user is engaging in an activity based on cosine similarities between a feature vector corresponding to the activity and others of the plurality of feature vectors.

11. A system comprising a non-transitory memory which stores computer-executable process steps and a processing device coupled to the memory and constructed to execute the process steps stored in the memory, wherein the stored process steps include steps which when executed by the processor cause the processor to perform the steps of:
  training a vector engine using a plurality of lists, each of the plurality of lists containing metadata associated with a plurality of media objects, the vector engine including a neural network trained with corpus data including (i) the plurality of lists (ii) a plurality of titles each one of the plurality of titles associated with one of the plurality of lists and (iii) the metadata associated with the plurality of media objects in each list, wherein training the vector engine includes:
  initializing, using the vector engine, a plurality of feature vectors representing each of the plurality of lists, each of the plurality of media objects, and each of a plurality of words in the titles of the plurality of lists, and
  nudging, using the vector engine, the plurality of feature vectors based on a plurality of co-occurrences of (i) the plurality of lists, (ii) the plurality of media objects, (iii) the plurality of words in the titles of the plurality of lists, or (iv) a combination thereof; and
  selecting either (i) at least one of the plurality of media objects, (ii) at least one of the plurality of lists, or (iii) a combination thereof based on cosine similarities between two or more of the plurality of feature vectors.

12. The system according to claim 11 wherein the neural network is comprised of at least one of a gradient descent model, a stochastic gradient descent model, a Continuous Bag-of-Words (CBOW) model, a skip-gram model, a hierarchical soft-max model and a negative sampling model.

13. The system according to claim 11 wherein the stored process steps further include steps which when executed by the processor cause the processor to perform the steps of:
  identifying among the plurality of feature vectors a feature vector corresponding to an activity; and
  selecting either (i) at least one of the plurality of media objects, (ii) at least one of the plurality of lists or (iii) a combination thereof suitable for the activity based on cosine similarities between the feature vector corresponding to the activity and others of the feature vectors.

14. The system according to claim 11, wherein the vector engine is further trained with one or more pre-trained word vectors, wherein training the vector engine further includes:
  nudging, using the vector engine, the plurality of feature vectors and the pre-trained word vectors based on a plurality of co-occurrences of (i) the plurality of lists, (ii) the plurality of media objects, (iii) the plurality of words in the titles of the plurality of lists, (iv) the one or more pre-trained word vectors, or (v) a combination thereof.

15. The system according to claim 11, wherein the vector engine is further trained with text corpus data that includes a plurality of documents each containing a plurality of words, wherein training the vector engine further includes:
  initializing, using the vector engine, feature vectors for each of the plurality of words contained in the plurality of documents, and
  nudging, using the vector engine, the plurality of feature vectors based on a plurality of co-occurrences of (i) the plurality of lists, (ii) the plurality of media objects, (iii) the plurality of words in the titles of the plurality of lists, (iv) the plurality of words contained in the plurality of documents, or (v) a combination thereof.

16. The system according to claim 11, wherein the corpus data further includes tags for the plurality of lists each tag associating a word or phrase to one of the plurality of lists, wherein training the vector engine further includes:
  initializing, using the vector engine, feature vectors for each of a plurality of words in the tags of the plurality of lists; and
  nudging, using the vector engine, the plurality of feature vectors based on a plurality of co-occurrences of (i) the plurality of lists, (ii) the plurality of media objects, (iii) the plurality of words in the titles of the plurality of lists, (iv) the plurality of words in the tags of the plurality of lists, or (v) a combination thereof.

17. The system according to claim 11, wherein the vector engine is further trained with interaction data that includes a plurality of interaction histories each containing metadata associated with a plurality of media objects, wherein training the vector engine further includes:
  initializing, using the vector engine, feature vectors for each of the plurality of interaction histories; and
  nudging, using the vector engine, the plurality of feature vectors based on a plurality of co-occurrences of (i) the plurality of lists, (ii) the plurality of media objects contained in the plurality of lists, (iii) the plurality of words in the titles of the plurality of lists, (iv) the plurality of media objects contained in the plurality of interaction histories, or (v) a combination thereof.

18. The system according to claim 11 wherein the stored process steps further include steps which when executed by the processor cause the processor to perform the steps of:
   detecting that a user is engaging in an activity based on data collected from a client device;
   identifying among the plurality of feature vectors a feature vector corresponding to the activity; and
   selecting either (i) at least one of the plurality of media objects, (ii) at least one of the plurality of lists or (iii) a combination thereof suitable for the activity based on cosine similarities between the feature vector corresponding to the activity and others of the plurality of feature vectors.

19. The system according to claim 18 wherein the data collected from the client device includes at least one of location data, calendar data, physical activity data, biometric data, accelerometer data, gyroscope data, user settings, third party application data, and client device type.

20. The system according to claim 11 wherein the stored process steps further include steps which when executed by the processor cause the processor to perform the step of:
   detecting that a user is engaging in an activity based on cosine similarities between a feature vector corresponding to the activity and others of the plurality of feature vectors.

21. A non-transitory computer-readable storage medium storing a program for causing a computer to implement a method of selecting media suitable for a predetermined activity, the method comprising the steps of:
   training a vector engine using a plurality of lists, each of the plurality of lists containing metadata associated with a plurality of media objects, the vector engine including a neural network trained with corpus data including (i) the plurality of lists (ii) a plurality of titles each one of the plurality of titles associated with one of the plurality of lists and (iii) the metadata associated with the plurality of media objects in each list, wherein training the vector engine includes:
   initializing, using the vector engine, a plurality of feature vectors representing each of the plurality of lists, each of the plurality of media objects, and each of a plurality of words in the titles of the plurality of lists; and
   nudging, using the vector engine, the plurality of feature vectors based on a plurality of co-occurrences of (i) the plurality of lists, (ii) the plurality of media objects, (iii) the plurality of words in the titles of the plurality of lists, or (iv) a combination thereof;
   selecting either (i) at least one of the plurality of media objects, (ii) at least one of the plurality of lists, or (iii) a combination thereof based on cosine similarities between two or more of the plurality of feature vectors.

22. The non-transitory computer-readable storage medium according to claim 21 wherein the neural network is comprised of at least one of a gradient descent model, a stochastic gradient descent model, a Continuous Bag-of-Words (CBOW) model, a skip-gram model, a hierarchical soft-max model and a negative sampling model.

23. The non-transitory computer-readable storage medium according to claim 21 wherein the program further causes the computer to implement the steps of:
   identifying among the plurality of feature vectors a feature vector corresponding to an activity; and
   selecting either (i) at least one of the plurality of media objects, (ii) at least one of the plurality of lists or (iii) a combination thereof suitable for the activity based on cosine similarities between the feature vector corresponding to the activity and others of the feature vectors.

24. The non-transitory computer-readable storage medium according to claim 21, wherein the vector engine is further trained with one or more pre-trained word vectors, wherein training the vector engine further includes:
   nudging, using the vector engine, the plurality of feature vectors and the pre-trained word vectors based on a plurality of co-occurrences of (i) the plurality of lists, (ii) the plurality of media objects, (iii) the plurality of words in the titles of the plurality of lists, (iv) the one or more pre-trained word vectors, or (v) a combination thereof.

25. The non-transitory computer-readable storage medium according to claim 21, wherein the vector engine is further trained with text corpus data that includes a plurality of documents each containing a plurality of words, wherein training the vector engine further includes:
   initializing, using the vector engine, feature vectors for each of the plurality of words contained in the plurality of documents; and
   nudging, using the vector engine, the plurality of feature vectors based on a plurality of co-occurrences of (i) the plurality of lists, (ii) the plurality of media objects, (iii) the plurality of words in the titles of the plurality of lists, (iv) the plurality of words contained in the plurality of documents, or (v) a combination thereof.

26. The non-transitory computer-readable storage medium according to claim 21, wherein the corpus data further includes tags for the plurality of lists, each tag associating a word or phrase to one of the plurality of lists, wherein training the vector engine further includes:
   initializing, using the vector engine, feature vectors for each of a plurality of words in the tags of the plurality of lists; and
   nudging, using the vector engine, the plurality of feature vectors based on a plurality of co-occurrences of (i) the plurality of lists, (ii) the plurality of media objects, (iii) the plurality of words in the titles of the plurality of lists, (iv) the plurality of words in the tags of the plurality of lists, or (v) a combination thereof.

27. The non-transitory computer-readable storage medium according to claim 21, wherein the vector engine is further trained with interaction data that includes a plurality of interaction histories each containing metadata associated with a plurality of media objects, wherein training the vector engine further includes:
   initializing, using the vector engine, feature vectors for each of the plurality of interaction histories; and
   nudging, using the vector engine, the plurality of feature vectors based on a plurality of co-occurrences of (i) the plurality of lists, (ii) the plurality of media objects contained in the plurality of lists, (iii) the plurality of words in the titles of the plurality of lists, (iv) the plurality of media objects contained in the plurality of interaction histories, or (v) a combination thereof.

28. The non-transitory computer-readable storage medium according to claim 21 wherein the program further causes the computer to implement the steps of:
   detecting that a user is engaging in an activity based on data collected from a client device;
   identifying among the plurality of feature vectors a feature vector corresponding to the activity; and
   selecting either (i) at least one of the plurality of media objects, (ii) at least one of the plurality of lists or (iii) a combination thereof suitable for the activity based on cosine similarities between the feature vector corresponding to the activity and others of the plurality of feature vectors.

29. The non-transitory computer-readable storage medium according to claim 28 wherein the data collected from the client device includes at least one of location data, calendar data, physical activity data, biometric data, accelerometer data, gyroscope data, user settings, third party application data, and client device type.

30. The non-transitory computer-readable storage medium according to claim 21 wherein the program further causes the computer to implement the step of:
   detecting that a user is engaging in an activity based on cosine similarities between a feature vector corresponding to the activity and others of the plurality of feature vectors.

* * * * *